(12) United States Patent
Hoffman et al.

(10) Patent No.: US 8,355,022 B2
(45) Date of Patent: Jan. 15, 2013

(54) METHOD AND APPARATUS FOR AGGREGATING LIGHT SOURCES PER-VERTEX IN COMPUTER GRAPHICS

(75) Inventors: Nathaniel Hoffman, Santa Monica, CA (US); Vassily A. Filippov, Long Beach, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1028 days.

(21) Appl. No.: 12/323,306

(22) Filed: Nov. 25, 2008

(65) Prior Publication Data

US 2010/0128037 A1  May 27, 2010

(51) Int. Cl.
G06T 15/50  (2011.01)
G06T 15/60  (2006.01)

(52) U.S. Cl. ........................................... 345/426
(58) Field of Classification Search .................. None
See application file for complete search history.

(56) References Cited

U.S. PATENT DOCUMENTS

| | | | |
|---|---|---|---|
| 4,709,231 A | 11/1987 | Sakaibara et al. | |
| 4,901,064 A | 2/1990 | Deering | |
| 5,146,557 A | 9/1992 | Yamrom et al. | |
| 5,163,126 A | 11/1992 | Einkauf et al. | |
| 5,253,339 A | 10/1993 | Wells et al. | |
| 5,369,737 A | 11/1994 | Gholizadeh et al. | |
| 5,377,313 A | 12/1994 | Scheibl | |
| 5,579,456 A | 11/1996 | Cosman | |
| 5,613,050 A | 3/1997 | Hochmuth et al. | |
| 5,659,671 A | 8/1997 | Tannenbaum et al. | |
| 5,673,374 A | 9/1997 | Sakaibara et al. | |
| 5,675,720 A | 10/1997 | Sato et al. | |
| 6,097,394 A | 8/2000 | Levoy et al. | |
| 6,163,319 A | 12/2000 | Peercy et al. | |
| 6,504,538 B1 | 1/2003 | Freund et al. | |
| 6,646,640 B2 | 11/2003 | Nagy | |
| 6,717,575 B2 | 4/2004 | Hino et al. | |
| 2001/0048444 A1 | 12/2001 | Hurley et al. | |
| 2004/0130552 A1 | 7/2004 | Duluk, Jr. et al. | |
| 2004/0155879 A1* | 8/2004 | Mittring | 345/426 |
| 2005/0248571 A1* | 11/2005 | McTaggart | 345/426 |
| 2007/0195067 A1* | 8/2007 | Zotov et al. | 345/179 |
| 2007/0206008 A1 | 9/2007 | Kaufman et al. | |

OTHER PUBLICATIONS

Arvo, J., The Irradiance Jacobian for Partially Occluded Polyhedral Sources, SIGGRAPH 1994: Proceedings of the 21st Annual Conference on Computer Graphics and Interactive Techniques, pp. 343-350; 1994.*

Tabellion, E. et al., An Approximate Global Illumination System for Computer Generated Films, ACM Trans. Graph. vol. 23, No. 3, pp. 469-476, 2004.*

(Continued)

Primary Examiner — Kee M Tung
Assistant Examiner — Carlos Perromat
(74) Attorney, Agent, or Firm — Fitch, Even, Tabin & Flannery, LLP

(57) ABSTRACT

A method for use in computer graphics includes establishing a surface that is represented by at least one polygon that includes a plurality of vertices, establishing one or more light sources that are configured to illuminate the surface, and computing an aggregate light source position for each vertex of the polygon, wherein the computation for each vertex includes averaging directions from the vertex to the one or more light sources. A storage medium stores a computer program, and an apparatus includes a display and a processor based system.

33 Claims, 10 Drawing Sheets

OTHER PUBLICATIONS

Patent Cooperation Treaty; "Notification of Transmittal of the International Search Report and the Written Opinion of the International Searching Authority, or the Declaration" issued in PCT/US09/63629; mailed Jan. 13, 2010; 1 page.

Patent Cooperation Treaty; "International Search Report" issued in PCT/US09/63629; mailed Jan. 13, 2010; 3 pages.

Patent Cooperation Treaty; "Written Opinion of the International Searching Authority" issued in PCT/US09/63629; mailed Jan. 13, 2010; 7 pages.

Gershun, A. (1936). "The Light Field", Moscow, 1936. Translated by P. Moon and G. Timoshenko in Journal of Mathematics and Physics, vol. XVIII, MIT, 1939, pp. 51-151.

Rupard, Jason; "Ray Tracing and Global Illumination" (2003); The Osprey Journal of Ideas and Inquiry; Jan. 1, 2003; pp. 56-69; vol. III, 2003; University of North Florida; http://digitalcommons.unf.edu/ojii_volumes/105.

USPTO; Non-Final Office Action issued in U.S. Appl. No. 12/323,340; mailed Mar. 29, 2012; 10 Pages.

* cited by examiner

METHOD AND APPARATUS FOR AGGREGATING LIGHT SOURCES PER-VERTEX IN COMPUTER GRAPHICS

CROSS-REFERENCE TO RELATED APPLICATIONS

This application is related to U.S. patent application Ser. No. 12/323,340, filed of even date herewith, entitled "METHOD AND APPARATUS FOR INTERPOLATING COLOR AND DIRECTION AS ONE ENTITY IN COMPUTER GRAPHICS," also by inventors Nathaniel Hoffman and Vassily A. Filippov, the entire disclosure of which is incorporated herein by reference.

BACKGROUND OF THE INVENTION

1. Field of the Invention

The present invention relates generally to computer graphics, and more specifically to dynamic lighting used in computer graphics.

2. Discussion of the Related Art

Lighting in computer graphics refers to the placement of lights in a scene to achieve some desired effect. The lighting process involves lighting the pixels in the polygons that form a computer model. Dynamic lighting refers to the process of computing lighting calculations in real time to account for real-time variations, such as changes in game state, player's and characters' positions, camera movement, etc.

SUMMARY OF THE INVENTION

One embodiment provides a method for use in computer graphics, comprising: establishing a surface that is represented by at least one polygon that includes a plurality of vertices; establishing one or more light sources that are configured to illuminate the surface; and computing an aggregate light source position for each vertex of the polygon, wherein the computation for each vertex includes averaging directions from the vertex to the one or more light sources.

Another embodiment provides a storage medium storing a computer program executable by a processor based system, the computer program causing the processor based system to execute steps comprising: establishing a surface that is represented by at least one polygon that includes a plurality of vertices; establishing one or more light sources that are configured to illuminate the surface; and computing an aggregate light source position for each vertex of the polygon, wherein the computation for each vertex includes averaging directions from the vertex to the one or more light sources.

Another embodiment provides an apparatus for use in computer graphics, comprising: a display; and a processor based system coupled to the display and configured to establish on the display a surface that is represented by at least one polygon that includes a plurality of vertices, establish one or more light sources that are configured to illuminate the surface, and compute an aggregate light source position for each vertex of the polygon, wherein the computation for each vertex includes averaging directions from the vertex to the one or more light sources.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Two techniques for rendering lights in computer graphics are per-pixel lighting (or "pixel lighting") and per-vertex lighting (or "vertex lighting"). With per-pixel lighting the lighting equation is evaluated per-pixel, which means the light is computed at every pixel of the model. Per-pixel lighting provides good quality but is expensive to implement. Per-vertex lighting only calculates the lighting at the vertices of the computer model and then interpolates the lighting over the surface of the model. Per-vertex lighting is less expensive to implement than per-pixel lighting but does not provide as good of quality.

Some of the embodiments of the present invention provide a hybrid approach to lighting which uses aspects of both per-vertex lighting and per-pixel lighting. For example, in some embodiments the method starts with techniques used in per-vertex lighting, but then some calculations are done per-pixel to improve the quality.

Figure 1:
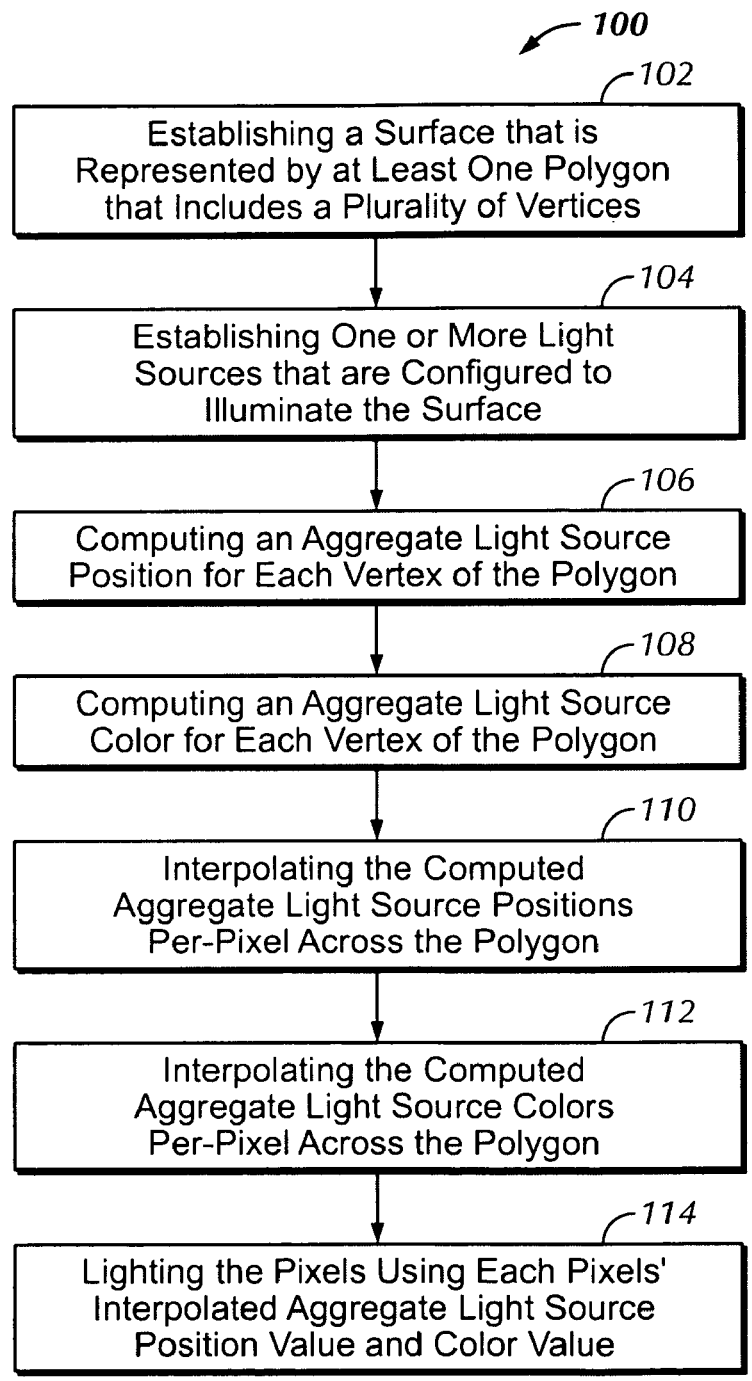
FIG. 1 is a flow diagram illustrating a method for use in computer graphics lighting in accordance with an embodiment of the present invention.

FIG. 1 illustrates the general flow of a method 100 according to an embodiment of the present invention. The method 100 may be used for providing dynamic lighting in computer graphics. In step 102, a surface is established that is represented by at least one polygon. For example, a triangle or other polygon mesh may be used to define the shape of an object to be rendered. In step 104, one or more light sources are established that are configured to illuminate the surface. For example, a scene of a video game or other computer simulation may include a character defined by a triangle mesh that is illuminated by several different light sources, such as ambient light, directional lighting, and/or omni lighting.

Figure 2:
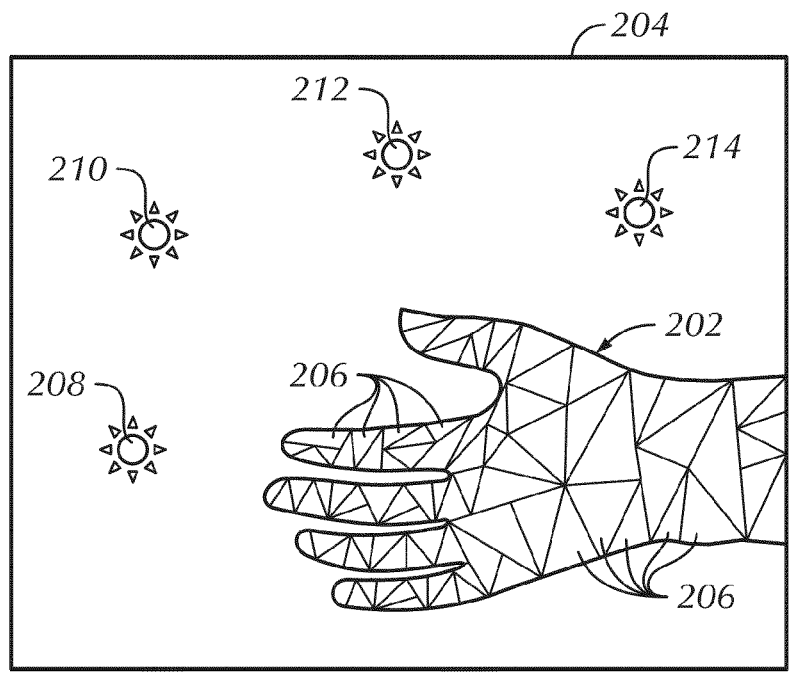
FIG. 2 is a screen shot illustrating a surface represented by polygons that is illuminated by light sources to be used in accordance with embodiments of the present invention.

FIG. 2 illustrates an example of these first two steps. Specifically, a polygon mesh that defines the shape of a human hand 202 is established on a display 204. The surface of the human hand 202 is represented by at least one polygon, in this case many triangles 206, with each triangle including three vertices. One or more light sources 208, 210, 212, and 214 are established on the display 204 that are configured to illuminate the surface of the human hand 202.

Returning to the method 100 (FIG. 1), the light sources are aggregated per-vertex. First, the positions of the light sources are aggregated, and then the colors of the light sources are aggregated. More specifically, in step 106 an aggregate light source position is computed for each vertex of each of the polygons. As will be discussed in detail below, the computing of the aggregate light source position for each vertex includes averaging the directions from the vertex to the one or more light sources. In step 108, an aggregate light source color is computed for each vertex of the polygon.

In step 110, the computed aggregate light source positions for the vertices of each polygon are interpolated per-pixel across the polygon. This step, which may be performed by a pixel shader, provides an interpolated aggregate light source position value for each of the pixels in the polygon. Similarly, in step 112 the computed aggregate light source colors for the vertices of each polygon are interpolated across the polygon. This provides an interpolated aggregate light source color value for each of the pixels in the polygon. In some embodiments, linear interpolation may be used for the interpolation of both the aggregate light source positions and colors. Finally, in step 114 the pixels are lit using each pixel's respective interpolated aggregate light source position value and color value.

The method 100 provides a solution that provides better quality lighting than per-vertex lighting. This is at least partly due to some calculations being performed per-pixel. Yet, the solution is less expensive and requires less processing power than per-pixel lighting in the multi-light scenario. Because the method 100 uses less processing power than per-pixel lighting, it works well for implementing dynamic lighting, i.e. the process of computing lighting calculations in real time to account for real-time variations, such as changes in game state, player's and characters' positions, camera movement, etc. As such, the method 100 may be used, for example, to provide the primary or non-primary source of dynamic direct lighting in computer simulations, such as video games. The method 100 may be referred to herein as a method of providing dynamic lighting or a method of providing dynamic vertex lights. The later term should not be confused with conventional vertex lighting.

The solution provided by the method 100 is significantly less expensive than per-pixel lighting for at least two reasons. First, multiple lights are combined into a single aggregate light per-vertex. This means that, after interpolation, only a single lighting calculation is required per-pixel. Second, the distance falloff function is calculated per-vertex rather than per-pixel.

Figure 3:
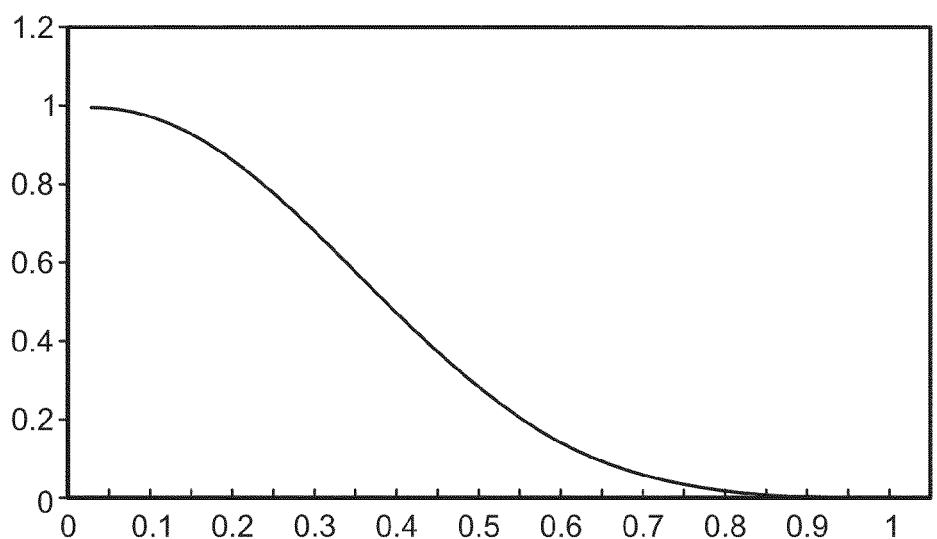
FIG. 3 is a graph illustrating a falloff function in accordance with an embodiment of the present invention.

In some embodiments, the falloff function is a scaled and biased cosine curve (from positive peak to negative peak), as follows:

$$\frac{1}{4}(\cos(\max(R/R_0, 1) \times \pi) + 1)^2 \qquad \text{Eq. (1)}$$

where R defines the distance between a point where light intensity is being calculated and the light source; and Ro defines a radius of an inner zone around a light where it is assumed the light has full intensity (no falloff). This band-limited function, which is illustrated in FIG. 3, was chosen to minimize interpolation artifacts due to per-vertex evaluation. That is, it helps to minimize the artifacts that are caused by the Gouraud interpolation of per-vertex values across the triangle. It has been found to be smooth, inexpensive, and having a first derivative that approaches 0 as the function itself approaches 0.

Figure 4A:
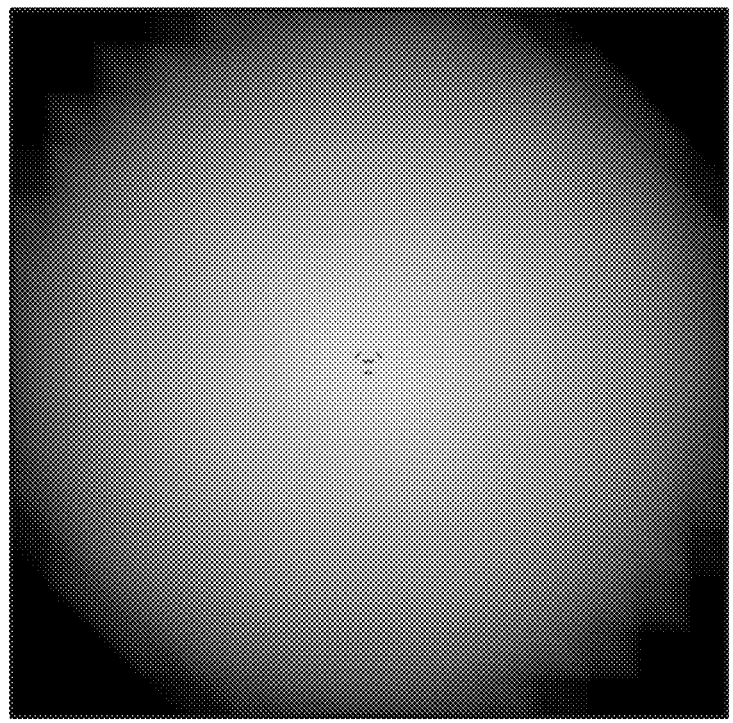
FIGS. 4A and 4B are photographs illustrating the falloff function in accordance with embodiments of the present invention.
Figure 4B:
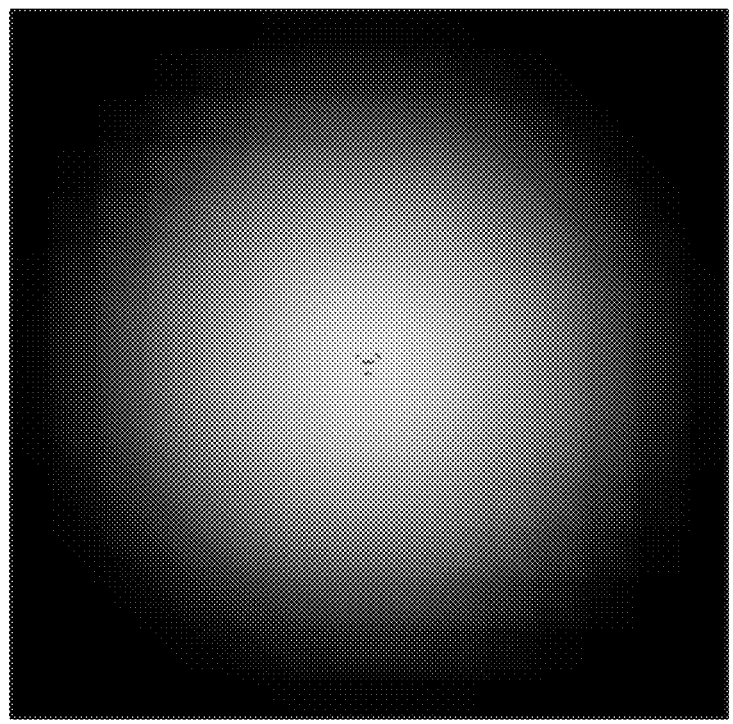

In order to illustrate the falloff function, FIGS. 4A and 4B show identical directional lights shining straight down. In FIG. 4A a linear falloff is used, while in FIG. 4B the above cosine curve falloff is used. Both falloff functions were set to reach zero at the same distance.

The method 100 (FIG. 1) may be used with many different types of lights, which for example may include but is not limited to, directional, omni (point), and ambient lights. In some embodiments, directional lights may be converted to point lights before combining/aggregating. Furthermore, the directional and omni lights may be combined into a single (interpolated) representation. The interpolated representation for directional and omni lights is a world space position and an RGB color. The ambient lights may be combined into a separate RGB interpolator.

It was mentioned above that in step 106 an aggregate light source position is computed for each vertex of each polygon, and then in step 110 the computed positions are interpolated per-pixel across each polygon. It has been found that interpolating a position rather than a direction provides good results. For example, interpolating a position can make the visuals appear independent of tessellation. Furthermore, it is believed that with this representation, a single vertex light can appear indistinguishable from a single pixel light (other than the falloff function) regardless of mesh tessellation.

Figure 5A:
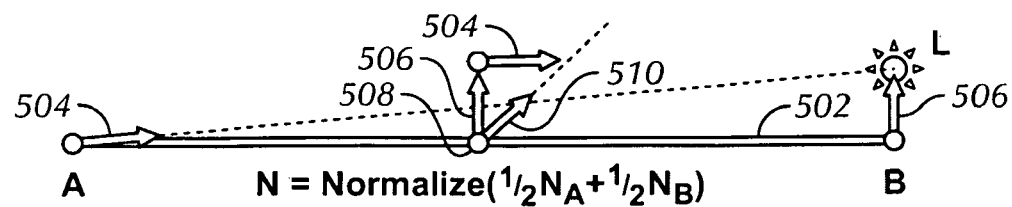
FIGS. 5A and 5B are diagrammatic views illustrating interpolation per-pixel across a polygon in accordance with an embodiment of the present invention.
Figure 5B:
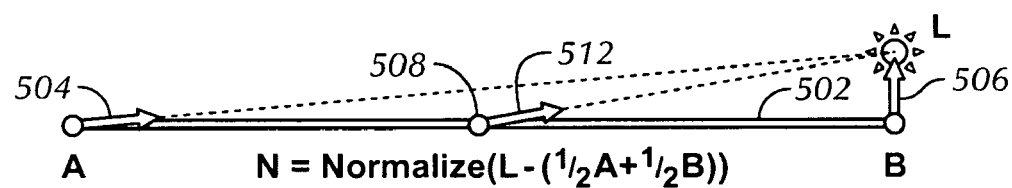

FIGS. 5A and 5B illustrate the benefits of interpolating a position per-pixel rather than a direction. FIG. 5A, which illustrates the interpolation of directions, shows the edge of polygon 502 that has its surface positioned perpendicular to the page. The polygon 502 includes vertices A and B. A light source L represents an aggregated light source for both vertex A and vertex B. A light vector 504 at vertex A points in the direction towards the light source L, and a light vector 506 at vertex B points in the direction towards the light source L. The results of interpolating the directions of vectors 504 and 506 across the polygon 502 are illustrated at a pixel 508 between vertices A and B. As shown, combining vectors 504 and 506 produces a light vector 510 for pixel 508. The calculation is represented by the following equation:

$$N = \text{normalize}(\tfrac{1}{2}N_A + \tfrac{1}{2}N_B) \qquad \text{Eq. (2)}$$

The light vector 510 does not point to the light source L. This is an undesirable result because the light vector 510 will cause the pixel 508 to be lit in a way that is inconsistent with the light source L.

On the other hand, FIG. 5B illustrates the interpolation of the position of the light source L across the polygon 502. The result is that the pixel 508 sees the light source L in a world space position that is consistent with vertices A and B. This causes a light vector 512 for pixel 508 to point directly at the light source L. The calculation is represented by the following equation:

$$N = \text{normalize}(L - (\tfrac{1}{2}A + \tfrac{1}{2}B)) \qquad \text{Eq. (3)}$$

This is a more desirable result because the light vector 512 will cause the pixel 508 to be lit in a way that is consistent with the light source L. Therefore, interpolating position rather than direction can make the visuals appear independent of tessellation. With no falloff, a single vertex light can be made to appear indistinguishable from a single pixel light regardless of mesh tessellation. With falloff, the artifacts will result only from calculation of the falloff per vertex.

It was mentioned above that computing the aggregate light source position for each vertex includes averaging the directions from the vertex to the one or more light sources. A discussion will now be provided of a method of computing the aggregate light source position in accordance with an embodiment of the present invention.

Figure 6:
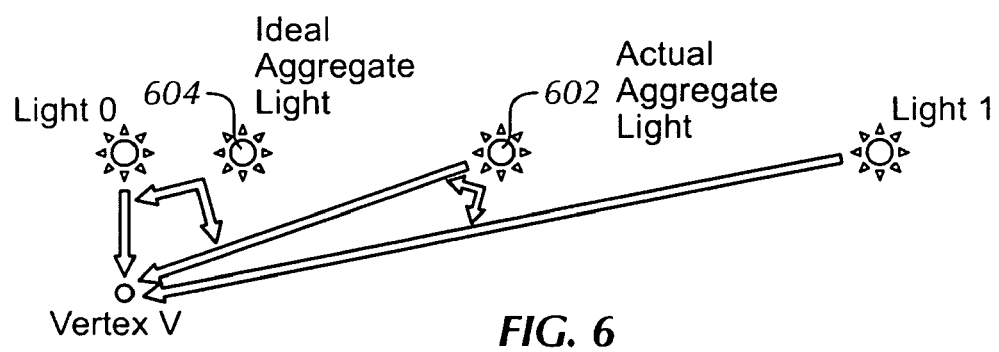
FIG. 6 is a diagrammatic view illustrating an analysis of aggregation of light sources in accordance with an embodiment of the present invention.

FIG. 6 illustrates a naive approach to computing an aggregate light position. As shown, light 0 and light 1 illuminate vertex V. It will be assumed that with falloff, the intensities generated at vertex V by light 0 and light 1 are equal. In this example, the aggregate light position is computed by simply averaging the positions of light 0 and light 1. The result of this computation is an aggregate light position 602. As shown, the light direction from the aggregate light position 602 at vertex V is much closer to the direction from light 1 than the direction from Light 0. This result is undesirable because the distant light, i.e. light 1, is over-emphasized. A better and more balanced result would be an aggregate light position 604. Therefore, it has been found that simply averaging positions has the effect of exaggerating the importance of distant lights.

In order to achieve a better and more balanced result, embodiments of the present invention provide a method in which the positions of the light sources are aggregated while dividing the weight of each light source by the length of a vector from the light source to the vertex, to avoid over-emphasizing distant lights. This causes the averaging to essentially be performed on directions, while still using positions for input data and result. As discussed above, using a position as the result is beneficial when the computation is performed per-vertex because it provides good results when interpolated over the triangles or other polygons. That is, although the interpolated representation uses positions, it is believed that for best visual results their directions should be averaged.

Figure 7:
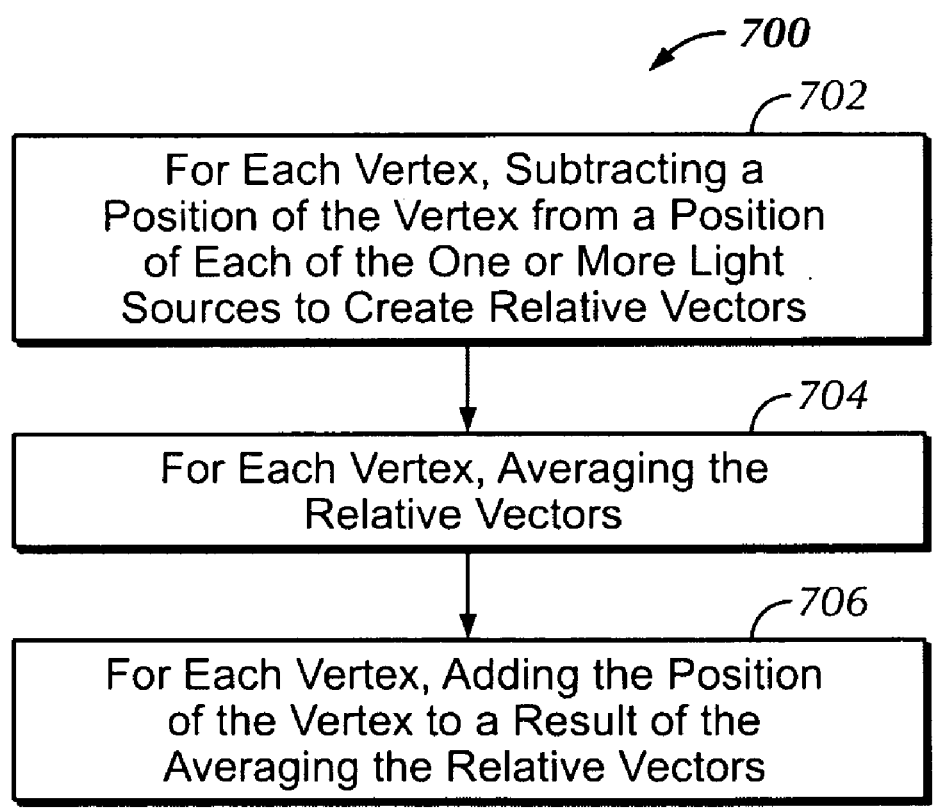
FIG. 7 is a flow diagram illustrating a method for use in computing an aggregate light position in accordance with an embodiment of the present invention.

More specifically, FIG. 7 illustrates a method 700 of computing an aggregate light position in accordance with an embodiment of the present invention. In step 702, the world vertex position is subtracted from each world light position to create relative vectors. The world vertex position is the position of the vertex for which lights are being combined. In step 704, the relative vectors are averaged. In some embodiments, the averaging uses weights divided by the vector lengths. Then in step 706, the vertex position is added back at the end.

In some embodiments, the method 700 may be illustrated by the following equation (4):

$$L_{agg} = \frac{\displaystyle\sum_{i \in [0 \ldots n]} \frac{W_i (L_i - V)}{\|L_i - V\|}}{\displaystyle\sum_{i \in [0 \ldots n]} \frac{W_i}{\|L_i - V\|}} + V \qquad \text{Eq. (4)}$$

where: $L_{agg}$ is the aggregate light position; $L_i$ is the light position for Light i; V is the position of the vertex for which lights are being combined; $W_i$ is the light weight for Light i based on the intensity of Light i at V; and n is number of lights in the current light context.

Figure 8A:
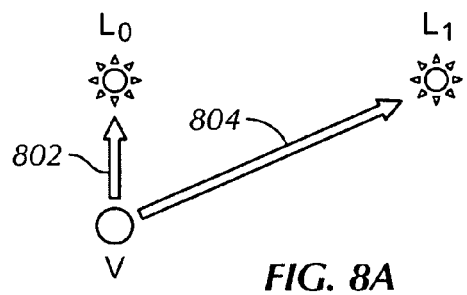
FIGS. 8A, 8B, 8C and 8D are diagrammatic views illustrating an application of the method shown in FIG. 7 in accordance with an embodiment of the present invention.

An example application of the method 700 is illustrated in FIGS. 8A, 8B, 8C and 8D. Specifically, FIG. 8A shows a vertex V and two light sources $L_0$ and $L_1$. A light vector 802 points to light source $L_0$, and a light vector 804 points to light source $L_1$.

Figure 8B:
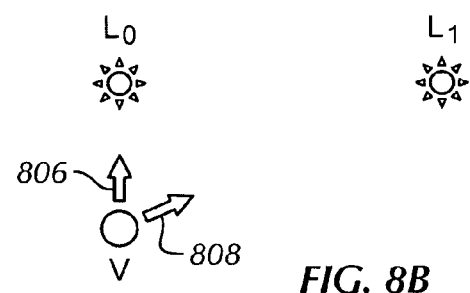

In FIG. 8B, the position of the vertex V has been subtracted from the position of each of the light sources $L_0$ and $L_1$ to create relative vectors 806 and 808.

Figure 8C:
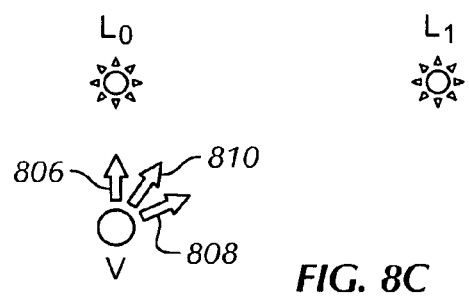

In FIG. 8C, the relative vectors 806 and 808 are averaged, which results in vector 810. In some embodiments, the averaging of the relative vectors 806 and 808 may use a weight of each light source $L_0$ and $L_1$ divided by a length of a vector to the light source, i.e. light vectors 802 and 804 (FIG. 8A). In some embodiments, the averaging of unit light vectors may use a weight of each light source $L_0$ and $L_1$ divided by an accumulated weight. As will be discussed below, in some embodiments the weight of each light source $L_0$ and $L_1$ may be based on an intensity of the light source at the vertex V.

Figure 8D:
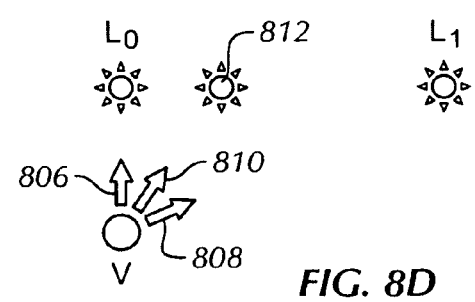

Finally, in FIG. 8D, the position of the vertex V is added to the result of the averaging of the relative vectors 806 and 808, which provides the aggregate light source position 812. As illustrated, the aggregate light source position 812 is approximately located on the line connecting the original light sources $L_0$ and $L_1$.

Thus, the method can be seen as converting the positions into normalized directions, averaging those, and then converting the result back to a position.

Another advantage of this method is the ease of combining directional lights with omni lights. Specifically, for a directional light the unit-length direction can simply be accumulated. There is no need to divide the weight by the vector length since it is already normalized. In the case of a mesh lit by a single normalized light, the interpolated "light position" is offset by a unit-length vector from each vertex.

There are various options for computing the weight factor. As mentioned above, in some embodiments the weight of each light source is based on an intensity of the light source at the vertex. In some embodiments, only the light intensity is used when calculating light weight ($W_i$) and RGB is ignored. It has been found that this approximation provides a good appearance and has tangible workflow benefits for artists. Namely, an artists can change the color of the light without changing the interpolated light position.

In some embodiments, the weight factor may be computed using the falloff function multiplied by the light intensity multiplied by the luminance of the light's color. However, dropping the luminance of the light's color and using only the intensity and falloff are believed to provide better results.

Figure 9A:
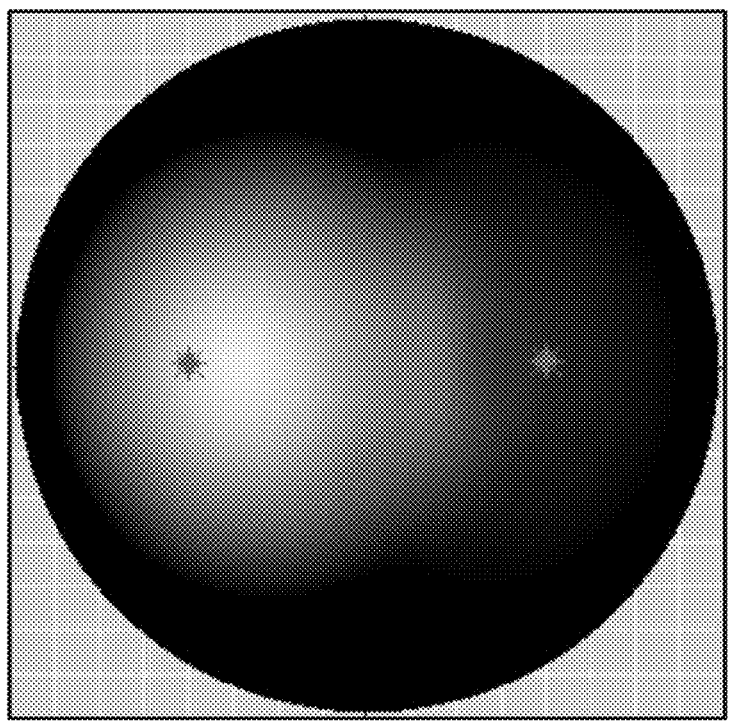
FIGS. 9A and 9B are photographs illustrating the results of a weight factor in accordance with embodiments of the present invention.
Figure 9B:
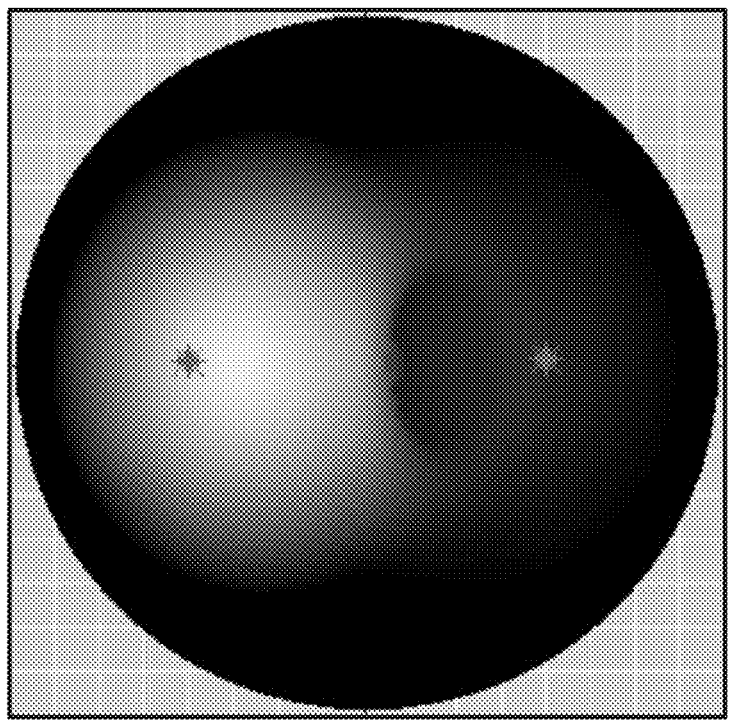

Namely, ignoring the light color is believed to produce better visuals. For example, FIG. 9A illustrates the result when the luminance of the light's color is used, and FIG. 9B illustrates the result when the luminance of the light's color is not used and only scalar intensity is used. And as eluded to above, accounting for the intensity of the light but not its color also gives the artist more control over the aggregation of the dynamic lights described herein. This is because color and intensity can be independently varied to produce the same resulting color, and only one of them affects light importance for aggregation purposes.

In the method 700 (FIG. 7) of computing an aggregate light position described above, lights are combined without regard for shadowing. Since lights are combined without regard for shadowing, it is desirable in some embodiments to reduce the contributions of lights which are back facing to the vertex. Otherwise, in cases where lights are shining in roughly opposite directions, the light behind the mesh will influence the lighting color and direction, causing severe artifacts. It is desirable to use a smooth function to reduce back facing light contributions, otherwise the abrupt changes in position along side-facing vertices will cause artifacts.

In some embodiments, a function that may be used is the dot-product between the light direction and the vertex normal, scaled and biased to a range between 0 and 1, including 0 and 1:

$$W'_i = W_i \left( \frac{1}{2} (N_v \cdot L_i) + \frac{1}{2} \right) \qquad \text{Eq. (5)}$$

where: $W_i$ is the weight of Light i; $W'_i$ is the resulting weight of Light i; $N_v$ is the vertex normal at the vertex V; and $L_i$ is the light direction of Light i at vertex V. This function is not physically based, but is instead an approximation that looks reasonably good. This function has an effect of scaling light weight to 0 as the angle between the light vector and the vertex normal approaches 180°.

After the positions of the light sources are aggregated, the next step is to compute an aggregate light source color for each vertex of the polygon (step 108 of FIG. 1). As such, a method of computing the aggregate light color in accordance with an embodiment of the present invention will now be described.

The back facing light factor described above tends to have consequences on computing the aggregate color. Specifically, once the back facing factor is added into the aggregate direction computation, the results become more sensitive to the exact method used to combine the light colors into the final aggregate color. Many methods will cause noticeable artifacts at vertices with a normal N at close to 90 degrees to the light vector. That is, many methods will cause noticeable artifacts along side facing vertices, even if a smooth function is used to reduce contribution of back facing lights to the aggregate direction.

In some embodiments, one method that may be used is to multiply the light colors (attenuated by falloff) by the saturated (clamped) dot product between the individual light direction and the aggregate light direction. This means that the aggregate light direction needs to be computed first. Therefore, in some embodiments, computing the dynamic lights described herein becomes a two-pass process: in the first pass the aggregate position/direction is computed (step 106 of FIG. 1), and in the second pass the aggregate color is computed (step 108 of FIG. 1).

This method of computing the aggregate light color may be illustrated by the following aggregate color formula/equation (6):

$$C_{agg} = \sum_{i \in [0 \ldots n]} C_i \times sat((\vec{L}_i \cdot \vec{L}_{agg})) \qquad \text{Eq. (6)}$$

where: $C_{agg}$ is the aggregate light color at the Vertex V; $C_i$ is the color of Light i attenuated by the distance between Light i and Vertex V; $L_i$ is the direction of Light i at Vertex V; and $L_{agg}$ is the aggregate light direction calculated earlier.

Figure 10:
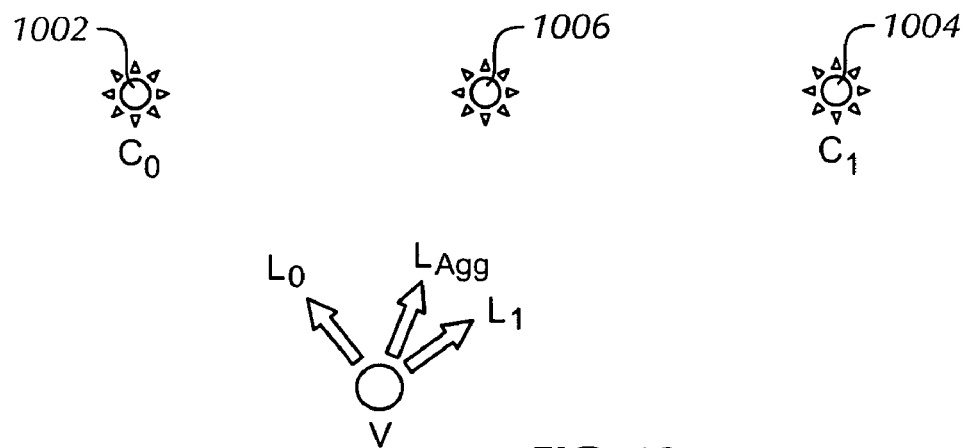
FIG. 10 is a diagrammatic view illustrating computation of an aggregate light color in accordance with an embodiment of the present invention.

An example application of this method of computing the aggregate light color is illustrated in FIG. 10. A vertex V and two light sources 1002 and 1004 are shown. $C_0$ is the color of light source 1002 attenuated by the distance between light source 1002 and vertex V. $C_1$ is the color of light source 1004 attenuated by the distance between light source 1004 and vertex V. Furthermore, $L_0$ is the direction of light source 1002 at vertex V, and $L_1$ is the direction of light source 1004 at vertex V.

It is assumed that the aggregate light source position 1006 has already been calculated as described above. As also described above, that computation involves averaging the directions of the light sources. Therefore, the aggregate light direction $L_{agg}$ has also already been calculated.

According to the above formula, the aggregate light source color $C_{agg}$ for vertex V is computed by first multiplying the color $C_0$ by the saturated dot product between the direction $L_0$ and the direction $L_{agg}$, then multiplying the color $C_1$ by the saturated dot product between the direction $L_1$ and the direction $L_{agg}$, and then summing the results. Therefore, in some embodiments, computing the aggregate light source color for each vertex of a polygon comprises, for each vertex, multiplying an attenuated color of each light source by a saturated dot product between a direction of the light source and a result of the averaging directions from the vertex to the one or more light sources, and then summing the results.

The reasoning behind using the above dot product formula will now be explained as follows. When lights are aggregated, the following aggregate light approximation is being performed:

$$\sum_{i \in (\vec{N} \cdot \vec{L}_i > 0)} (\vec{N} \cdot \vec{L}_i) c_i \approx (\vec{N} \cdot \vec{L}_{Agg}) c_{Agg} \qquad \text{Eq. (7)}$$

where N is the vertex normal.

Note that the summation is only over those lights for which the dot product with the normal is positive. All summations below will be assumed to be over this front facing subset of lights, and the explicit front facing condition notation on the summation will be omitted for brevity. Since the actual normal is not known when the lights are aggregated (due to normal mapping), this subset will be accounted for approximately by using a smooth back facing factor with the vertex normal, as discussed above.

It will be assumed for the moment that the light colors are achromatic and will be represented as scalar luminance values. That is, assuming the lights have a single scalar luminance value and no color, the approximation becomes exact:

$$\Sigma(\vec{N} \cdot \vec{L}_i) l_i = \vec{N} \cdot (\Sigma l_i \vec{L}_i) = (\vec{N} \cdot \vec{L}_{Agg}) l_{Agg} \qquad \text{Eq. (8)}$$

If the following equation is introduced:

$$\Sigma l_i \vec{L}_i = \vec{X} \qquad \text{Eq. (9)}$$

It follows that:

$$\vec{L}_{Agg} = \frac{\vec{X}}{|\vec{X}|} = \frac{\sum l_i \vec{L}_i}{|\sum l_i \vec{L}_i|};$$  Eq. (10)

$$l_{Agg} = |\vec{X}| = |\sum l_i \vec{L}_i|;$$  Eq. (11)

With respect to concepts relating to Vector X, additional information may be found in the paper by ARUN GERSHUN, entitled "The Light Field", Moscow, 1936 (Translated by P. Moon and G. Timoshenko in *Journal of Mathematics and Physics*, Vol. XVIII, MIT, 1939, pp. 51-151), which discusses a light vector, and the paper by JAMES ARVO, entitled "The Irradiance Jacobian for Partially Occluded Polyhedral Sources," SIGGRAPH 1994: Proceedings of the 21st annual conference on Computer graphics and interactive techniques, 1994, pp. 343-350, which discusses the vector irradiance, both papers of which are hereby fully incorporated by reference herein in their entireties.

Figure 11:
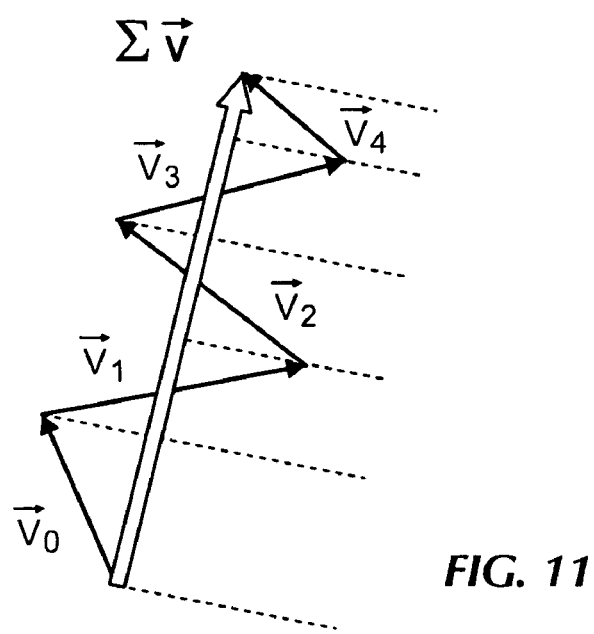
FIG. 11 is a diagram illustrating the summing of multiple input vectors to form a result vector.

FIG. 11 illustrates the summing of multiple input vectors to form a result vector. As can be seen in the figure, when multiple input vectors are summed to form a result vector, the length of the result vector is equal to the sum of the projections of the input vectors onto the result vector. That is, when adding multiple vectors $V_i$, the result vector V is equal to the sum of the projections of $V_i$ onto V. Or more formally:

$$\left|\sum_i \vec{V}_i\right| = \frac{\left|\sum_i \vec{V}_i\right|^2}{\left|\sum_i \vec{V}_i\right|}$$

$$= \frac{\left(\sum_i \vec{V}_i\right) \cdot \left(\sum_i \vec{V}_i\right)}{\left|\sum_i \vec{V}_i\right|}$$

$$= \frac{\sum_i \sum_j \vec{V}_i \cdot \vec{V}_j}{\left|\sum_i \vec{V}_i\right|}$$

$$= \frac{\sum_i \left(\vec{V}_i \cdot \left(\sum_j \vec{V}_j\right)\right)}{\left|\sum_i \vec{V}_i\right|}$$

$$= \sum_i \left(\vec{V}_i \cdot \frac{\sum_j \vec{V}_j}{\left|\sum_j \vec{V}_j\right|}\right)$$

Eq. (12)

Applying this equation to the light aggregation scenario provides:

$$l_{Agg} = |\vec{X}| = \left|\sum_{i<=n} \vec{L}_i\right| = \sum_{i<=n} \left(\vec{L}_i \cdot \frac{\sum_{j<=n} \vec{L}_j}{\left|\sum_{j<=n} \vec{L}_j\right|}\right)$$  Eq. (13)

When applied to the aggregated luminance, and substituting $L_{Agg}$, this means that:

$$l_{Agg} = \sum_i l_i (\vec{L}_i \cdot \vec{L}_{Agg})$$  Eq. (14)

This suggests a straightforward generalization from achromatic luminance values to RGB color values. Therefore, extending to RGB provides:

$$C_{Agg} = \Sigma C_i (\vec{L}_i \cdot \vec{L}_{Agg})$$  Eq (15)

This is what is described above in relation to FIG. 10, adding saturation of the dot product. Namely, one difference is that the above-described method in FIG. 10 uses a saturated (clamped to 0) dot product, which is believed to produce better visual results with back facing lights.

Therefore, in the above-described embodiment the colors of the light sources are aggregated in a physically principled manner to produce a single value, which is less expensive than using three values (for R, G, and B).

The above sections state that the computed dynamic lights are passed to the pixel shader for interpolation as one direction and one color. This is actually a slight simplification. Namely, in some embodiments, two colors are actually passed to the pixel shader. That is, in some embodiments, every dynamic light is marked with whether it is affected by shadows or not. In practice, whether the light casts shadows may be used for this determination. The color aggregation occurs as listed above, but into two separate accumulators for shadowed and unshadowed lights. In the pixel shader the shadowed light color is multiplied by the shadowing factor and then added to the unshadowed light color. The result is a single color used in the shader.

Therefore, in some embodiments, the method of computing an aggregate light source color for each vertex may account for shadowed and unshadowed lights. By way of example, this may be done by determining whether the aggregate light source for each vertex casts shadows. For each vertex in which an aggregate light source casts shadows, a shadowed light source color is provided.

In the above-described hybrid approach to dynamic lighting, light sources are aggregated per-vertex. A two-pass process is used in which the aggregate position/direction is computed in a first pass (step 106 of FIG. 1), and then the aggregate color is computed in a second pass (step 108 of FIG. 1). The results of these computations are separately interpolated across the polygon per-pixel.

Although the above-described approach does minimize artifacts resulting from aggregating opposite lights, it does not eliminate them. An alternative approach in accordance with an embodiment of the present invention will now be described that is believed to completely eliminate the artifacts.

Specifically, although the above-described approach produces good results on the vertices themselves, sometimes artifacts appear on edges or triangle interiors.

These artifacts are due to the belief that vertices which are almost side facing to opposing lights will tend to have reductions in the interpolated color which are counterbalanced by an increase in the dot product between the normals and the aggregated light position (and vice versa). These tradeoffs between direction and color result in reasonable results on each vertex. However, the color is interpolated linearly, and the interpolation of the position causes a non-linear change in the dot-product. This causes artifacts to sometimes appear between vertices, although the remaining artifacts are relatively small.

Reflecting on this effect, it is believed that if the color and direction are interpolated as one entity rather than separately the artifacts would be eliminated. Note the equation (repeated from above):

$$\Sigma(\vec{N}\cdot\vec{L}_i)l_i=\vec{N}\cdot(\Sigma l_i\vec{L}_i) \qquad \text{Eq. (16)}$$

And the following equation (also repeated from above):

$$\Sigma l_i\vec{L}_i=\vec{X} \qquad \text{Eq. (17)}$$

These equations imply that it might be desirable to interpolate the vector quantity X directly. Using this interpolated representation, rather than the original separate color and position, has a couple of advantages. First, the interpolation artifacts are believed to be eliminated, and the pixel shader is slightly less expensive, since the interpolated vector does not need to be subtracted or normalized. On the other hand, the use of this interpolated representation also has a few drawbacks. Namely, since effectively a direction and not a position are interpolated, tessellation-dependent artifacts may result, even with a single light. Next, since the summed vector is used directly, any back facing factor will affect the lighting (by dimming side-facing lights). And finally, as stated, it only allows for monochromatic lights.

The last drawback can be eliminated by extending the method to RGB. The present invention provides different ways of extending to RGB. For example, in one embodiment, the method comprises generating three independent vectors for R, G and B. The three vectors may be represented as follows:

$$\vec{X}_{R_i}=\Sigma R_i L_i \qquad \text{Eq (18)}$$

$$\vec{X}_{G_i}=\Sigma G_i L_i \qquad \text{Eq (19)}$$

$$\vec{X}_{B_i}=\Sigma B_i L_i \qquad \text{Eq (20)}$$

Then, a convex combination is performed on the three vectors using appropriate weighting factors to generate a luminance vector. The original R, G and B vectors are then dotted with the normalized luminance vector to produce an RGB color which is interpolated independently of the luminance vector. This embodiment works reasonably well, but it may introduce some tessellation-dependent artifacts when lights of very different colors are used.

The tessellation-dependent artifacts can be solved by interpolating independent R, G and B vectors. Thus, in another embodiment, the method comprises generating three independent vectors for R, G and B as described above, and then interpolating the independent R, G and B vectors across the polygon. This embodiment provides good results, but because three independent R, G and B vectors are interpolated, an additional interpolator may be needed. Additional information may be found in the paper by ERIC TABELLION and ARNAULD LAMORLETTE, entitled "An Approximate Global Illumination System for Computer Generated Films," ACM Trans. Graph. vol. 23, no. 3, 2004, pp. 469-476, which is hereby fully incorporated by reference herein in its entirety.

Figure 12:
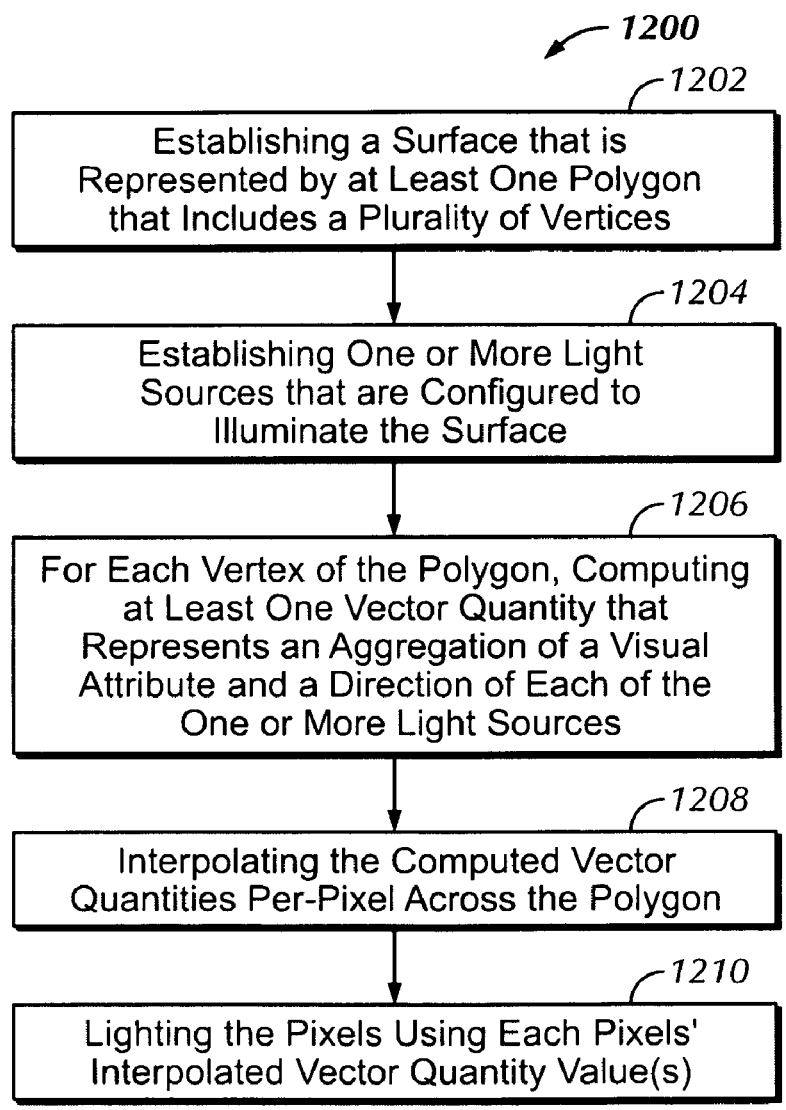
FIG. 12 is a flow diagram illustrating a method for use in computer graphics lighting in accordance with an embodiment of the present invention.

FIG. 12 illustrates a method 1200 according to an embodiment of the present invention that uses the concept of interpolating a vector quantity directly. Specifically, in step 1202 a surface is established that is represented by at least one polygon that includes a plurality of vertices, and in step 1204 one or more light sources are established that are configured to illuminate the surface. These steps may be performed in the same or similar manner as described above.

In step 1206, for each vertex of the polygon, at least one vector quantity is computed that represents an aggregation of a visual attribute and a direction of each of the one or more light sources. In some embodiments, if monochromatic lights are adequate, the visual attribute may comprise a luminance value, and only one vector quantity is computer per vertex. The single vector quantity may comprise a summation of the luminance value multiplied by the direction for each of the one or more light sources, as shown in Equation (17) above.

Figure 13:
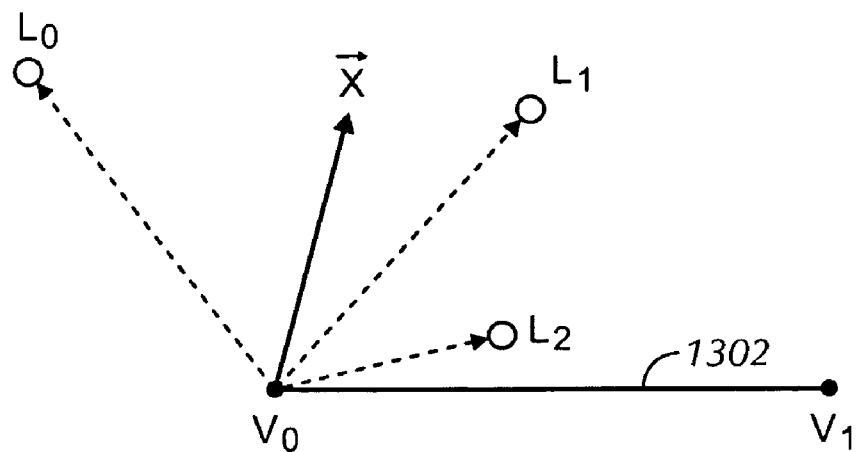
FIG. 13 is a diagrammatic view illustrating an application of a step of the method shown in FIG. 12 in accordance with an embodiment of the present invention.

FIG. 13 illustrates an example of the monochromatic light scenario. A polygon 1302, which has its surface positioned perpendicular to the page, includes two vertices $V_0$ and $V_1$. Three light sources $L_0$, $L_1$, and $L_2$ are configured to illuminate the surface of the polygon 1302. A vector quantity X is computed that comprises a summation of the luminance value multiplied by the direction for each of the three light sources $L_0$, $L_1$, and $L_2$. As will be discussed below, the vector quantity X is what will be interpolated across the polygon 1302 to the pixels between the two vertices $V_0$ and $V_1$.

If monochromatic lights are not adequate, then in some embodiments the visual attribute comprises a color value. The at least one vector quantity may comprise a summation of the color value multiplied by the direction for each of the one or more light sources. Furthermore, the at least one vector quantity may comprise first, second, and third vector quantities that each correspond to a different color value. For example, the first, second, and third vector quantities may respectively correspond to Red, Green, and Blue color values, as shown in Equations (18), (19), and (20) above, and as described in the independent R, G and B vector scenario above. Namely, in some embodiments, the first vector quantity comprises a summation of a red color value multiplied by the direction for each of the one or more light sources, the second vector quantity comprises a summation of a green color value multiplied by the direction for each of the one or more light sources, and the third vector quantity comprises a summation of a blue color value multiplied by the direction for each of the one or more light sources.

In step 1208 (FIG. 12), the computed vector quantities are interpolated per-pixel across the polygon to provide at least one interpolated vector quantity value for each of a plurality of pixels included in the polygon. In the monochromatic light scenario, this results in one interpolated vector quantity value for each pixel, and in the RGB color scenario, this results in three interpolated vector quantity values for each pixel. In some embodiments, linear interpolation may be used for the interpolation. Finally, after the interpolation, each of the pixels may be lit using the interpolated vector quantity value(s), as shown in step 1210.

Two approaches to providing dynamic lighting in computer graphics have been described. In some embodiments, the first approach involves aggregating the position and color of the lights according to novel methods and then separately interpolating the values across the polygon. This approach is reasonably inexpensive and provides good quality dynamic lights. In some embodiments, the techniques for light aggregation may be used in baked vertex lighting. This allows baked vertex lighting to be treated as yet another vertex light at render time.

In some embodiments, the second approach involves computing at least one vector quantity that represents an aggregation of a visual attribute and a direction of each of the light sources and then interpolating the vector quantities across the polygon. Both the first and second approaches may be used, for example, to provide the primary or non-primary source of dynamic direct lighting in computer simulations, such as video games. Both approaches may be used to support at least three types of dynamic lights, such as directional, omni and ambient lights.

In some embodiments, the methods and techniques described herein may be utilized, implemented and/or run on many different types of systems, devices and apparatuses. Examples of such systems, devices and apparatuses include, but are not limited to, computers, entertainment systems, game consoles, portable entertainment systems/game devices, DVD players, Blu-ray disc players, hand-held devices, personal digital assistants (PDA), cell phones, smart phones, etc.

Figure 14:
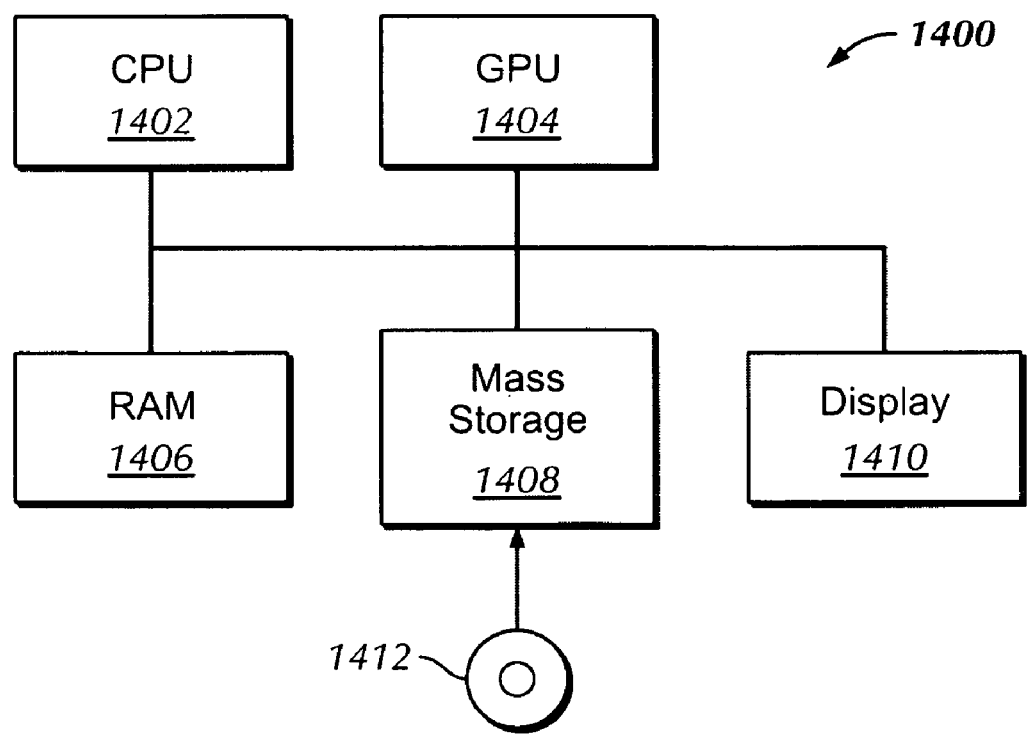
FIG. 14 is a block diagram illustrating a processor based system that may be used to run, implement and/or execute the methods and/or techniques shown and described herein in accordance with embodiments of the present invention.

FIG. 14 illustrates an example of a processor based system 1400 that may be used for implementing, executing and/or running any of the methods and techniques described herein. The processor based system 1400 may comprise a stand alone system or device, or it may be part of, or included in, any of the systems, devices and apparatuses listed above, or some other system, device or apparatus.

The processor based system 1400 may comprise any type of system having one or more processors. For example, in some embodiments the processor based system 1400 may include, but is not required to include, a central processing unit (CPU) 1402, a graphics processing unit (GPU) 1404, a random access memory (RAM) 1406, a mass storage unit 1408, and a display 1410. These components may be included in the same device or apparatus, or they may comprise separate devices or apparatuses. One or more components of the system 1400 may be used for implementing any system, device or apparatus mentioned above, such as for example a computer, entertainment system, game console, etc. However, the use of the system 1400 or any portion thereof is not required.

The CPU 1402 and/or GPU 1404 may be used to execute or assist in executing the steps of the methods and techniques described herein, such as the methods and techniques described above for aggregating light sources per-vertex in computer graphics. Furthermore, various content, images, computer models, surfaces, light sources, etc., may be rendered on the display 1410. The display 1410 may comprise any type of display and may be used for rendering the computer models, surfaces, light sources, etc., described above. For example, the display 1410 may be used for the display 204 (FIG. 2) described above.

The mass storage unit 1408 may include or comprise any type of computer readable storage or recording medium or media. The computer readable storage or recording medium or media may be fixed in the mass storage unit 1408, or the mass storage unit 1408 may optionally include removable storage media 1412, such as a digital video disk (DVD), Blu-ray disc, compact disk (CD), USB storage device, floppy disk, or other media. By way of example, the mass storage unit 1408 may comprise a disk drive, a hard disk drive, flash memory device, USB storage device, Blu-ray disc drive, DVD drive, CD drive, floppy disk drive, etc. The mass storage unit 1408 or removable storage media 1412 may be used for storing code that implements the methods and techniques described herein, such as code for performing the above-described dynamic lighting.

In some embodiments, one or more of the embodiments, methods, approaches, and/or techniques described above may be implemented in a computer program executable by a processor based system. By way of example, such processor based system may comprise the processor based system 1400, or a computer, entertainment system, game console, portable entertainment system/game device, etc. Such computer program may be used for executing various steps and/or features of the above-described methods and/or techniques. That is, the computer program may be used for causing or configuring a processor based system to achieve the functions described above. For example, such computer program may be used for implementing any embodiment of the above-described computer graphics lighting methods. As another example, such computer program may be used for implementing a vertex shader, pixel shader, or similar tool, using any one or more of the above described embodiments, methods, approaches, and/or techniques. In some embodiments, the computer program may comprise a video game, role-playing game (RPG), or other computer simulation. In some embodiments, program code modules, loops, subroutines, etc., within the computer program may be used for executing various steps and/or features of the above-described methods and/or techniques.

In some embodiments, the above-described computer program may be stored or embodied on a computer readable storage or recording medium or media. For example, the computer program may be stored or embodied on a computer readable storage or recording medium or media, such as may be included in the RAM 1406, the mass storage unit 1408, and/or the removable storage media 1412. That is, any of the storage devices, such as the RAM 1406, the mass storage unit 1408, and/or the removable storage media 1412, may be used for storing the code for the computer program. For example, any of such storage devices may serve as a tangible computer storage medium for embodying a computer program for causing a console, system, computer, or other processor based system to execute or perform the steps of any of the methods and/or techniques described herein.

Therefore, some embodiments of the present invention provide a storage medium storing a computer program executable by a processor based system, the computer program causing the processor based system to execute steps comprising: establishing a surface that is represented by at least one polygon that includes a plurality of vertices; establishing one or more light sources that are configured to illuminate the surface; and computing an aggregate light source position for each vertex of the polygon, wherein the computation for each vertex includes averaging directions from the vertex to the one or more light sources.

As another example, some embodiments of the present invention provide a storage medium storing a computer program executable by a processor based system, the computer program causing the processor based system to execute steps comprising: establishing a surface that is represented by at least one polygon that includes a plurality of vertices; establishing one or more light sources that are configured to illuminate the surface; for each vertex of the polygon, computing at least one vector quantity that represents an aggregation of a visual attribute and a direction of each of the one or more light sources; and interpolating the computed vector quantities across the polygon to provide at least one interpolated vector quantity value for each of a plurality of pixels included in the polygon.

While the invention herein disclosed has been described by means of specific embodiments and applications thereof, numerous modifications and variations could be made thereto by those skilled in the art without departing from the scope of the invention set forth in the claims.

What is claimed is:

1. A method for use in computer graphics, comprising:
establishing a surface that is represented by at least one polygon that includes a plurality of vertices;
establishing one or more light sources that are configured to illuminate the surface;
computing an aggregate light source position for each vertex of the polygon, wherein the computation for each vertex includes averaging directions from the vertex to the one or more light sources; and interpolating the computed aggregate light source positions across the polygon to provide an interpolated aggregate light source position value for each of a plurality of pixels included in the polygon.

2. The method of claim 1, wherein the computing an aggregate light source position for each vertex of the polygon comprises:
for each vertex, subtracting a position of the vertex from a position of each of the one or more light sources to create relative vectors; and
for each vertex, averaging the relative vectors.

3. The method of claim 1, wherein the computing an aggregate light source position for each vertex of the polygon comprises:
for each vertex, reducing contributions of light sources which are back facing to the vertex.

4. The method of claim 3, wherein for each vertex, the reducing contributions of light sources which are back facing to the vertex comprises:
computing a dot product between a direction of a light source at the vertex and a normal vector of the vertex.

5. The method of claim 1, further comprising:
computing an aggregate light source color for each vertex of the polygon.

6. The method of claim 5, wherein the computing an aggregate light source color for each vertex of the polygon comprises:
for each vertex, determining whether the aggregate light source color casts shadows; and
for each vertex, providing a shadowed light source color if the aggregate light source color casts shadows.

7. The method of claim 5, further comprising:
interpolating the computed aggregate light source colors across the polygon to provide an interpolated aggregate light source color value for each of a plurality of pixels included in the polygon.

8. The method of claim 1, further comprising:
lighting each of the plurality of pixels using the interpolated aggregate light source position value for each pixel.

9. A method for use in computer graphics, comprising:
establishing a surface that is represented by at least one polygon that includes a plurality of vertices;
establishing one or more light sources that are configured to illuminate the surface;
computing an aggregate light source position for each vertex of the polygon, wherein the computation for each vertex includes averaging directions from the vertex to the one or more light sources;
wherein the computing an aggregate light source position for each vertex of the polygon comprises:
for each vertex, subtracting a position of the vertex from a position of each of the one or more light sources to create relative vectors;
for each vertex, averaging the relative vectors; and
for each vertex, adding the position of the vertex to a result of the averaging the relative vectors;
wherein for each vertex the averaging the relative vectors comprises using a weight of each light source divided by a length of a vector to the light source.

10. The method of claim 9, wherein for each vertex the weight of each light source is based on an intensity of the light source at the vertex.

11. A method for use in computer graphics, comprising:
establishing a surface that is represented by at least one polygon that includes a plurality of vertices;
establishing one or more light sources that are configured to illuminate the surface;
computing an aggregate light source position for each vertex of the polygon, wherein the computation for each vertex includes averaging directions from the vertex to the one or more light sources; and
computing an aggregate light source color for each vertex of the polygon;
wherein the computing the aggregate light source color for each vertex of the polygon comprises:
for each vertex, multiplying an attenuated color of each light source by a saturated dot product between a direction of the light source and a result of the averaging directions from the vertex to the one or more light sources.

12. A non-transitory storage medium storing a computer program executable by a processor based system, the computer program causing the processor based system to execute steps comprising:
establishing a surface that is represented by at least one polygon that includes a plurality of vertices;
establishing one or more light sources that are configured to illuminate the surface;
computing an aggregate light source position for each vertex of the polygon, wherein the computation for each vertex includes averaging directions from the vertex to the one or more light sources; and
interpolating the computed aggregate light source positions across the polygon to provide an interpolated aggregate light source position value for each of a plurality of pixels included in the polygon.

13. The storage medium of claim 12, wherein the computing an aggregate light source position for each vertex of the polygon comprises:
for each vertex, subtracting a position of the vertex from a position of each of the one or more light sources to create relative vectors; and
for each vertex, averaging the relative vectors.

14. The storage medium of claim 12, wherein the computing an aggregate light source position for each vertex of the polygon comprises:
for each vertex, reducing contributions of light sources which are back facing to the vertex.

15. The storage medium of claim 14, wherein for each vertex, the reducing contributions of light sources which are back facing to the vertex comprises:
computing a dot product between a direction of a light source at the vertex and a normal vector of the vertex.

16. The storage medium of claim 12, further comprising:
computing an aggregate light source color for each vertex of the polygon.

17. The storage medium of claim 16, wherein the computing an aggregate light source color for each vertex of the polygon comprises:
for each vertex, determining whether the aggregate light source color casts shadows; and
for each vertex, providing a shadowed light source color if the aggregate light source color casts shadows.

18. The storage medium of claim 16, further comprising:
interpolating the computed aggregate light source colors across the polygon to provide an interpolated aggregate light source color value for each of a plurality of pixels included in the polygon.

19. The storage medium of claim 12, further comprising:
lighting each of the plurality of pixels using the interpolated aggregate light source position value for each pixel.

20. A non-transitory storage medium storing a computer program executable by a processor based system, the computer program causing the processor based system to execute steps comprising:
  establishing a surface that is represented by at least one polygon that includes a plurality of vertices;
  establishing one or more light sources that are configured to illuminate the surface;
  computing an aggregate light source position for each vertex of the polygon, wherein the computation for each vertex includes averaging directions from the vertex to the one or more light sources;
  wherein the computing the aggregate light source position for each vertex of the polygon further comprises:
  for each vertex, subtracting a position of the vertex from a position of each of the one or more light sources to create relative vectors;
  for each vertex, averaging the relative vectors; and
  for each vertex, adding the position of the vertex to a result of the averaging the relative vectors;
  wherein for each vertex the averaging the relative vectors comprises using a weight of each light source divided by a length of a vector to the light source.

21. The storage medium of claim 20, wherein for each vertex the weight of each light source is based on an intensity of the light source at the vertex.

22. A non-transitory storage medium storing a computer program executable by a processor based system, the computer program causing the processor based system to execute steps comprising:
  establishing a surface that is represented by at least one polygon that includes a plurality of vertices;
  establishing one or more light sources that are configured to illuminate the surface;
  computing an aggregate light source position for each vertex of the polygon, wherein the computation for each vertex includes averaging directions from the vertex to the one or more light sources; and
  computing an aggregate light source color for each vertex of the polygon;
  wherein the computing the aggregate light source color for each vertex of the polygon comprises:
  for each vertex, multiplying an attenuated color of each light source by a saturated dot product between a direction of the light source and a result of the averaging directions from the vertex to the one or more light sources.

23. An apparatus for use in computer graphics, comprising:
  a display; and
  a processor based system coupled to the display and configured to establish on the display a surface that is represented by at least one polygon that includes a plurality of vertices, establish one or more light sources that are configured to illuminate the surface, and compute an aggregate light source position for each vertex of the polygon, wherein the computation for each vertex includes averaging directions from the vertex to the one or more light sources; and
  wherein the processor based system is further configured to interpolate the computed aggregate light source positions across the polygon to provide an interpolated aggregate light source position value for each of a plurality of pixels included in the polygon.

24. The apparatus of claim 23, wherein in computing an aggregate light source position for each vertex of the polygon, the processor based system is further configured to:
  for each vertex, subtract a position of the vertex from a position of each of the one or more light sources to create relative vectors; and
  for each vertex, average the relative vectors.

25. The apparatus of claim 23, wherein in computing an aggregate light source position for each vertex of the polygon, the processor based system is further configured to:
  for each vertex, reduce contributions of light sources which are back facing to the vertex.

26. The apparatus of claim 25, wherein for each vertex, the reducing contributions of light sources which are back facing to the vertex comprises:
  computing a dot product between a direction of a light source at the vertex and a normal vector of the vertex.

27. The apparatus of claim 23, wherein the processor based system is further configured to:
  compute an aggregate light source color for each vertex of the polygon.

28. The apparatus of claim 27, wherein in computing an aggregate light source color for each vertex of the polygon, the processor based system is further configured to:
  for each vertex, determine whether the aggregate light source color casts shadows; and
  for each vertex, provide a shadowed light source color if the aggregate light source color casts shadows.

29. The apparatus of claim 27, wherein the processor based system is further configured to:
  interpolate the computed aggregate light source colors across the polygon to provide an interpolated aggregate light source color value for each of a plurality of pixels included in the polygon.

30. The apparatus of claim 23, wherein the processor based system is further configured to:
  light each of the plurality of pixels using the interpolated aggregate light source position value for each pixel.

31. An apparatus for use in computer graphics, comprising:
  a display; and
  a processor based system coupled to the display and configured to establish on the display a surface that is represented by at least one polygon that includes a plurality of vertices, establish one or more light sources that are configured to illuminate the surface, and compute an aggregate light source position for each vertex of the polygon, wherein the computation for each vertex includes averaging directions from the vertex to the one or more light sources;
  wherein in computing an aggregate light source position for each vertex of the polygon, the processor based system is further configured to:
  for each vertex, subtract a position of the vertex from a position of each of the one or more light sources to create relative vectors;
  for each vertex, average the relative vectors; and
  for each vertex, add the position of the vertex to a result of the averaging the relative vectors;
  wherein for each vertex the averaging the relative vectors comprises using a weight of each light source divided by a length of a vector to the light source.

32. The apparatus of claim 31, wherein for each vertex the weight of each light source is based on an intensity of the light source at the vertex.

33. An apparatus for use in computer graphics, comprising:
  a display; and
  a processor based system coupled to the display and configured to establish on the display a surface that is represented by at least one polygon that includes a plurality of vertices, establish one or more light sources that are configured to illuminate the surface, and compute an aggregate light source position for each vertex of the polygon, wherein the computation for each vertex includes averaging directions from the vertex to the one or more light sources;

wherein the processor based system is further configured to:
   compute an aggregate light source color for each vertex of the polygon;

wherein in computing an aggregate light source color for each vertex of the polygon, the processor based system is further configured to:

for each vertex, multiply an attenuated color of each light source by a saturated dot product between a direction of the light source and a result of the averaging directions from the vertex to the one or more light sources.

* * * * *